UNITED STATES PATENT OFFICE.

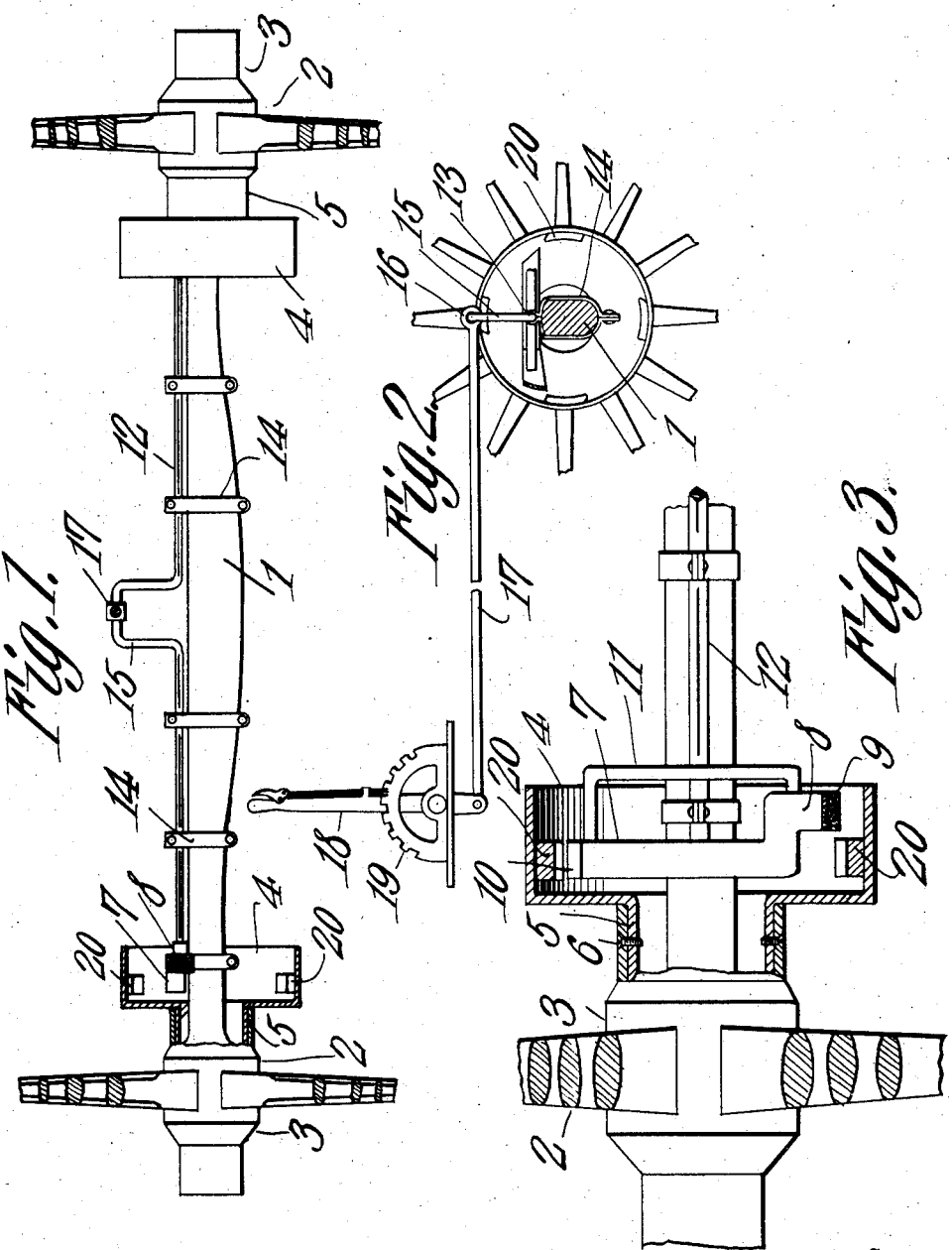

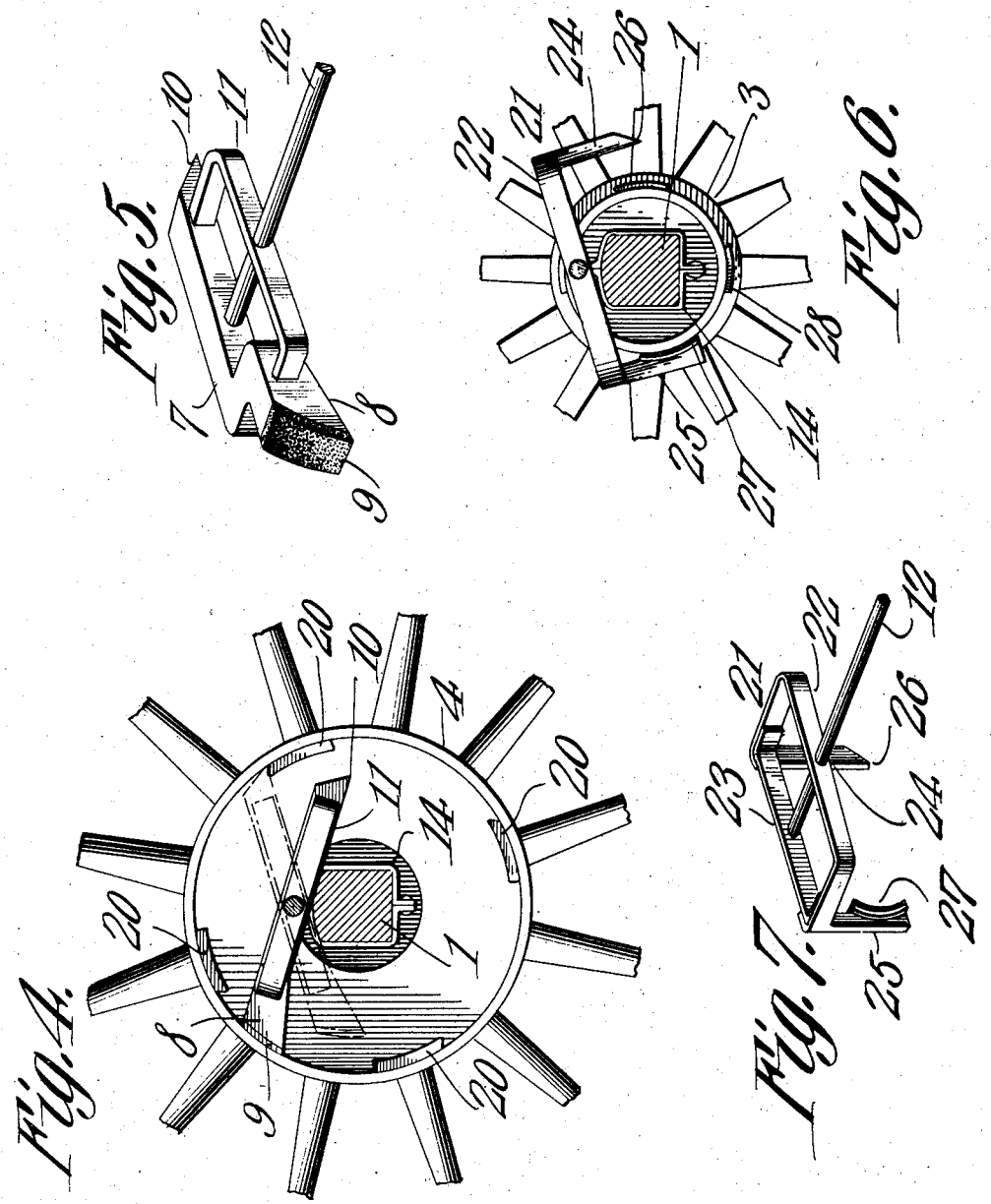

JOHN G. MILLER, OF BURLINGTON, IOWA.

VEHICLE-BRAKE.

No. 894,029.

Specification of Letters Patent.

Patented July 21, 1908.

Application filed March 5, 1908. Serial No. 419,321.

*To all whom it may concern:*

Be it known that I, JOHN G. MILLER, a citizen of the United States, residing at Burlington, in the county of Des Moines and State of Iowa, have invented a new and useful Vehicle-Brake, of which the following is a specification.

This invention relates to brakes for vehicles and has for its object to provide a brake especially adapted for light vehicles, such as buggies and carriages.

The invention further has for its object to provide a light and efficient brake which will be neat and inexpensive and take up very little room.

The invention has further for its object to provide a brake by means of which the wheels of a vehicle may be either braked or locked by the same brake with a single mechanism and at one operation.

The invention consists in a brake for vehicles constructed and arranged as herein set forth and claimed.

Referring to the accompanying drawings, Figure 1 is a view of a shaft of a vehicle and its wheels provided with a brake and mechanism constructed in accordance with this invention. Fig. 2 is a detail view showing the means for operating the brake. Fig. 3 is an enlarged detail view in vertical section showing the brake when applied to a hub. Fig. 4 is an enlarged detail end view showing the location of the brake on the hub. Fig. 5 is a detail view of the brake removed. Fig. 6 is a modification showing the brake applied to the outside of a hub. Fig. 7 is a detail view of the brake shown in Fig. 6 removed.

In carrying out the invention, the brake and its mechanism is mounted upon the rear axle 1 of a vehicle provided with the wheels 2 having hubs 3. Mounted on the inner side of the hubs 3 of each wheel is an annular rim or casing 4 formed preferably of a single piece of metal, provided with the tubular portion 5 located inside of the hub 3, and suitably secured thereto by screws 6 or other suitable means. The brake itself, of which there are two, one applied to each hind wheel, consists of a brake lever or beam 7 formed at one end with an angular portion or arm 8 having at its outer end a friction block 9, and the other end of the lever or beam 7 is formed with a suitable engaging point 10. The lever or beam 7 is provided with an angular strap 11. The brake is mounted on the end of a rod 12 extending through the strap 11 and engaging the beam or lever 7 and mounted and adapted to rotate in the rounded or eye portion 13 of the straps 14 clamped to the axle 1 by means of rivets, as shown. The rod 12 may be of square shape, as shown in Fig. 1, but has its portions mounted in the bearings 13 rounded, so as to rotate therein. The rod 12 midway between its ends is bent into the crank or U shaped portion 15 to which is connected by the hinge 16 the rod 17, having its outer end hinged to the lower end of an operating handle 18 adapted to engage and be locked with a rack 19, and located at a suitable place in the vehicle. The brake 1 in its normal position, as shown in Fig. 2, will occupy the horizontal position, each end thereof being out of engagement with the rim 4. The lever or beam 7 through the action of the rod 12 may be vibrated, so that in one direction the terminal end 9 will be moved into and out of engagement with the inner surface of the annular rim 4.

In order to employ the brake as an emergency brake to lock the wheel to the axle, the inner circumference of the annular rim 4 is provided with suitable projections 20 located at intervals on said circumference and adapted when the lever 7 is thrown into elevated position to engage its end 10 to lock the wheel to the axle.

When it is desired to merely brake the wheel by frictional engagement by pulling the lever 18, the frictional end of the brakes will be thrown into engagement with the inner surface of the annular rim 14, as shown in Fig. 4, and when it is desired to employ the brake as an emergency brake the lever 7 is thrown to the position whereby its end 10 will engage one of the stops 20 on the inner surface of the annular rim 4, and lock the wheel to the axle and instantly stop the vehicle.

In order to unlock the brake from its locked position, it is simply necessary to move the vehicle back and then throw the brake into the position shown in Fig. 2. By means of this invention a double brake is provided which will serve with both hind wheels of the vehicle to either brake them in frictional engagement or else by means of the same device and a single operating mechanism to lock them instantly in position, thereby providing a dual friction and emergency brake.

While the construction herein before set forth is preferably employed, I may dispense with the rim 4 and apply the friction and emergency brakes to the outside of the hub. In this modified form shown in Figs. 6 and 7 the brake beam is in the form of a rectangular frame 21 formed of the two angular straps 22 and 23 secured together in any suitable manner and mounted on the outer end of the rotary shaft 12. At the end of the axle 1 adjacent to the hub the frame 21 is provided on its opposite ends with the emergency brake 24 and friction brake 25, the emergency brake having a suitable engaging point 26 and the friction brake having a cushion 27. These brakes as shown depend on opposite sides of the hub and by the rotation of the lever 12 alternately engage the hub. Projections 28 are provided on the exterior of the hub for engagement with the emergency brake 24. While this form of brake may be used dispensing with the rim 4, it is not so satisfactory as the other form described, since it is apt to get clogged with mud and be in the way.

What is claimed is:—

1. The combination with the wheel of a vehicle, of a combined friction and emergency brake, and means for alternately moving said brake into frictional engagement with the wheel or to instantly lock the wheel to the axle, as herein set forth.

2. The combination with the wheel of a vehicle, of a vibratory brake beam or lever having a friction brake at one end and emergency brake at the other, and means for operating said brake lever whereby the brake may either be moved into frictional engagement with the wheel or lock said wheel to the axle, as herein set forth.

3. In a brake for vehicles, a wheel having its hub provided with an annular rim and a combined friction and emergency brake adapted to alternately engage said rim either to hold the wheel by friction or to instantaneously lock the same to the axle of the vehicle, and means for operating said brake, as herein set forth.

4. In a brake for vehicles, a wheel having its hub provided with an annular rim having spaced projections on the inner circumference of said rim, and a vibratory brake lever having one end adapted to frictionally engage the inner circumference of such rim, and the other adapted to engage the projections on the inner circumference of said rim, in combination with means for throwing said brake either into frictional engagement with said rim or else into locking engagement therewith to lock the wheel to the axle, as herein set forth.

5. In a brake for vehicles, a wheel provided with an annular rim having a tubular portion secured within the hub of the wheel and having projections on its inner circumference, in combination with a vibrating brake lever mounted on a rotary rod on the shaft of the vehicle and having one end adapted to be thrown into frictional engagement with the inner circumference of the rim, and its other end be thrown into locking engagement therewith, and means for operating said members to cause the brake to alternately serve as a friction and emergency brake, as herein set forth.

6. In a brake for vehicles, a wheel provided with an annular rim on the inner portion of its hub having projections on the inner circumference of said rim, a rotary rod, and means for operating the same mounted on the axle of the vehicle, and a combined friction and emergency brake mounted above said axle on the end of said rotary rod, and located in said annular rim, said brake adapted to be thrown alternately into frictional or locking engagement with said rim, as herein set forth.

7. A brake for vehicles consisting of a rotary shaft and means for operating the same mounted on the axle of the vehicle, and a combined friction and emergency brake mounted on each end of said rotary rod, in combination with an annular rim on each hub of each wheel of the vehicle, and having projections on its inner circumference, said brake being adapted to be thrown into frictional or locking engagement with said rim to hold or lock the wheels of the vehicle, as herein set forth.

8. In a brake for vehicles, the combination with the hub of the wheel of a vehicle, of a vibratory double friction and locking brake, adapted to be alternately thrown into frictional engagement, or instantly locked with said hub, and means for operating said brake.

9. In a brake for vehicles, a double brake consisting of an annular rim mounted on the hub of each wheel and having stops on its inner circumference, and a rotary rod operating mechanism connected with the axle of the vehicle, in combination with a vibrating brake lever mounted on each end of the rod and adapted to be moved into and out of engagement with the stops on the inner surface of the rim, whereby the brake serves as an emergency brake to lock the wheels to the axle, as herein set forth.

In testimony that I claim the foregoing as my own, I have hereto affixed my signature in the presence of two witnesses.

JOHN G. MILLER.

Witnesses:
   J. T. ILLICK,
   C. B. CALDWELL.